UNITED STATES PATENT OFFICE.

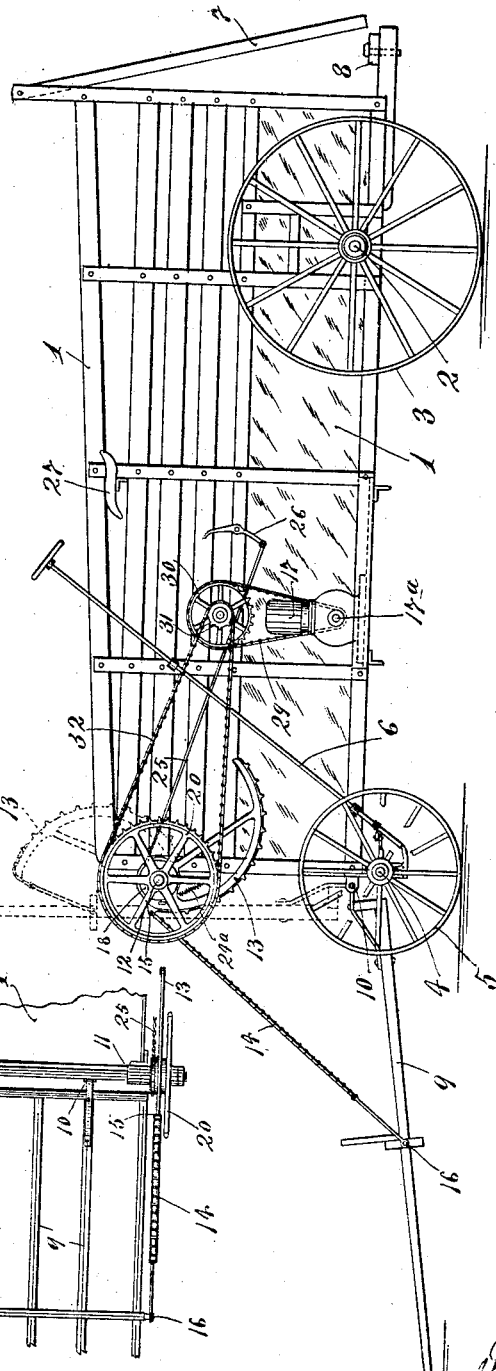

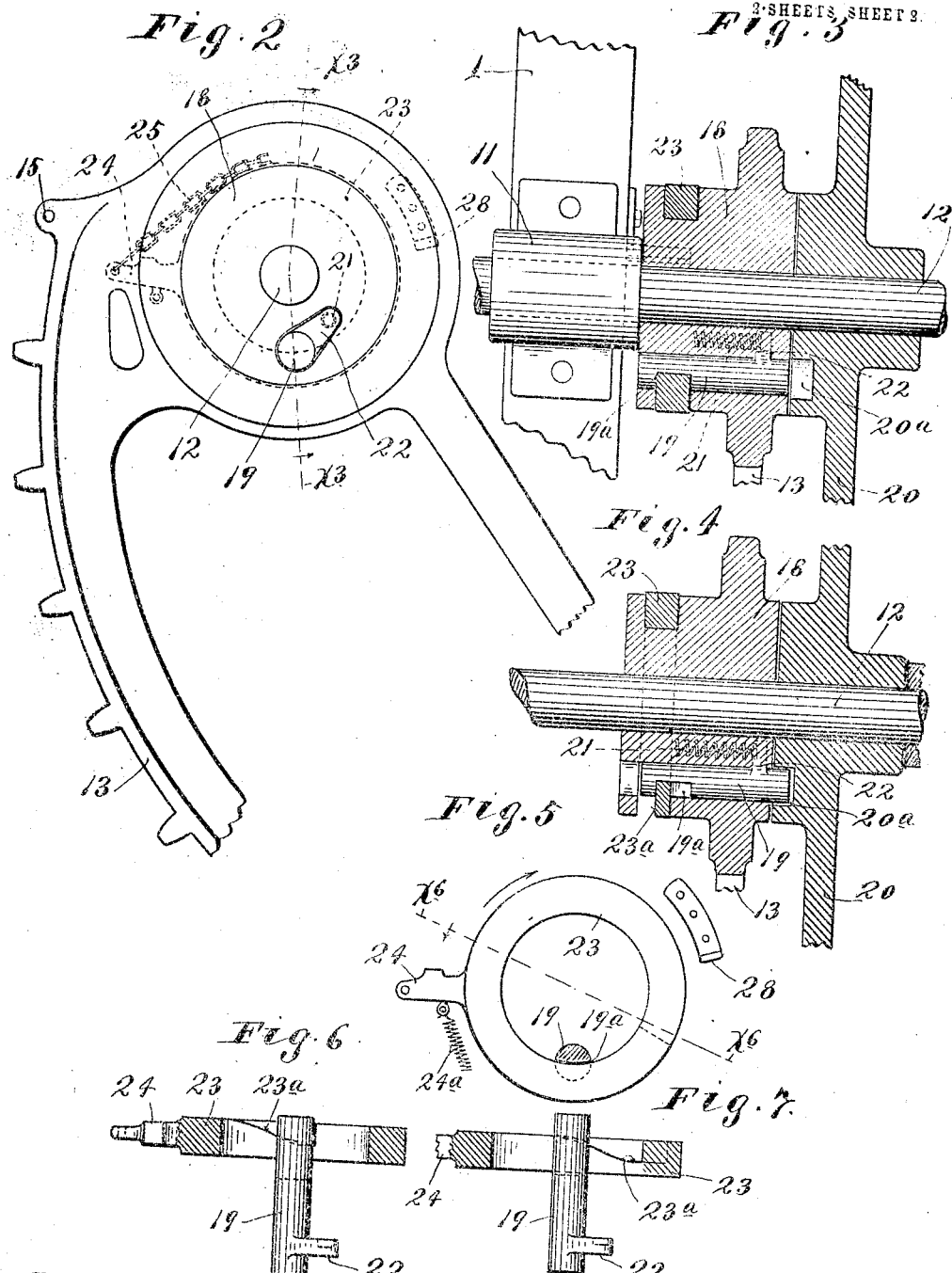

JOHN F. VALLENTYNE, OF MINNEAPOLIS, MINNESOTA.

SHOCK-LOADER.

1,110,469.  Specification of Letters Patent.  Patented Sept. 15, 1914.

Application filed November 11, 1911. Serial No. 659,760.

*To all whom it may concern:*

Be it known that I, JOHN F. VALLENTYNE, a citizen of the United States, residing at Minneapolis, in the county of Hennepin and State of Minnesota, have invented certain new and useful Improvements in Shock-Loaders; and I do hereby declare the following to be a full, clear, and exact description of the invention, such as will enable others skilled in the art to which it appertains to make and use the same.

My invention relates to shock loaders of that type wherein shocks of grain are picked up in succession by a large fork and are thrown rearward into the rack or box of a vehicle which is moved forward either by horses or by traction power. Particularly, the invention is directed to the provision of an improved means for operating the fork for picking up the shocks. Generally stated, the invention consists of the novel devices and combinations of devices hereinafter described and defined in the claims.

In the accompanying drawings which illustrate the invention, like characters indicate like parts throughout the several views.

Referring to the drawings, Figure 1 is a side elevation showing a shock loader having my invention incorporated therein; Fig. 1ª is a fragmentary plan view showing the front end portion of the rack or body of the carrying vehicle; Fig. 2 is a detail view in side elevation showing one of the fork actuating eccentrics, some parts thereof being broken away, and showing also portions of an improved clutch mechanism for operating the same; Fig. 3 is a sectional view taken approximately on the line $x^3$ $x^3$ on Fig. 2, some parts being broken away; Fig. 4 is a view corresponding to Fig. 3 but illustrating different positions of the parts of the clutch, some parts being broken away; Fig. 5 is a detail view chiefly in elevation but with some parts sectioned showing the clutch tripping cam ring, a clutch pin and a co-operating stop; Fig. 6 is a detail view in section taken approximately on the line $x^6$ $x^6$ on Fig. 5; and Fig. 7 is a view corresponding to Fig. 6 but illustrating different positions of the parts.

The shock carrying vehicle comprises a large box-like rack 1 having a rear axle 2 equipped with wheels 3 and provided with a front axle 4 equipped with wheels 5. The front axle 4 is intermediately pivoted to the body of the vehicle so that the carrying vehicle may be steered by a suitable device, which preferably includes a steering rod 6 having the usual connections to the said pivoted axle. This steering device, however, constitutes no part of the present invention. At the rear of the vehicle body is a hinged gate 7 and a transversely extended draft beam 8 to which draft horses, located on opposite sides of the machine may be hitched, in the well known way, to draw the carrying vehicle forward.

The loading fork 9, which is a large heavy structure of the usual or any suitable construction, is pivotally connected or hinged at 10 to the front portion of the rack 1. Journaled in suitable bearings 11 on the upper front portions of the sides of the rack 1, is a transversely extended shaft 12 to which fork lifting eccentrics 13, preferably of segmental form, are rigidly secured, one at each side of the machine. These eccentrics 13 are preferably provided with sprocket teeth for engagement with sprocket chains 14 that are attached to the said eccentrics at 15 and to the sides of the fork 9 at 16.

The numeral 17 indicates an explosive engine suitably secured on one side of the rack 1 and which is arranged to operate the shaft 12, to lift the fork, through suitable connections including a novel clutch mechanism, the construction of which will now be described.

The numeral 18 indicates a clutch hub which, in the present instance, is a hub of one of the eccentrics 13. Mounted for endwise movements in the hub 18, parallel to the axis of the shaft 12 by eccentrics to said shaft is a clutch bolt 19 that is adapted to engage with the bolt seat 20ª formed in the hub of a large sprocket 20 which is arranged to rotate on the shaft 12, but is held against lateral movements.

A coiled spring 21 seated in the hub 18 and pressing against an arm 22 of the said bolt 19, tends to engage the said bolt with the said seat 20ª but this engagement is normally prevented by a cam ring 23 seated for rotary movements on the said hub 18. This cam ring 23 is provided with a radially projecting arm 24 and with a reduced cam surface 23ª. It should be here noted that the clutch bolt 19 is provided with a notch 19ª in which the cam ring 23 is arranged to work. The arm 24 is connected by a chain 25, or other connection which is flexible at least in part, to one end of a foot actuating tripping lever 26. The upper end of this tripping lever 26 is located within reach of the foot of the operator when seated on the operator's seat 27, which latter is supported from and at one side of the rack 1. The arm 24 of the cam ring is adapted to be engaged when moved, with a fixed stop 28 secured on one side of the rack 1. As shown, the engine crank shaft 17ª carries a sprocket that drives a sprocket chain 29. The sprocket chain 29 runs over a sprocket wheel 30 mounted to rotate on a suitable bearing on the adjacent side of the rack 1 and provided on its hub with a smaller sprocket 31. A sprocket chain 32 runs over the sprocket 31 and over the larger sprocket 20, already described. When the machine is being driven forward, to pick up a shock, the fork 9 is down upon the ground, as shown in Fig. 1, and the clutch bolt 19 is then held in its inoperative position shown in Fig. 3, by the cam ring 23, so that the engine driven sprocket 20 then continues to run without effect. When the fork has been forced under a shock and it is desired to raise the fork and thereby throw the shock rearward into the rack, it is only necessary to press the foot on the foot lever 26. This oscillates the cam ring 23 so as to bring its reduced portion 23ª into the notch 19ª of the clutch bolt 19, and the spring 21 then becomes effective to throw the clutch bolt against the hub of the driven sprocket 20 and the said bolt will enter the bolt seat 20ª the first time it is brought into alinement therewith, by rotation of the said sprocket. This temporarily, as is evident, locks the engine driven sprocket 20 to the shaft 12 and the eccentrics 13 are thereby thrown upward so as to wind up the chains 14 and thereby raise the fork with its load. It is important to here note that in view of the fact that the eccentrics 13 first operate on the fork with a very short leverage, and that with gradually increasing length of leverage, greater power is rendered effective at slow speed to impart the initial upward movement of the fork and its load, thereby avoiding shock and excessive strains in overcoming the inertia of the load and the delivery of the load is accomplished with an increasing or accelerated speed. This is precisely what is desired to properly deliver the load into the rack. The latter part of the delivery of the load, when the frame is in a very greatly inclined position, is produced at such speed that the shock or grain does not have time to fall downward on the fork but will be properly delivered into the rack.

When the fork reaches approximately the position shown by dotted lines in Fig. 1, the arm 24 of the cam ring 23 stops, when it reaches the fixed stop 28 and the said ring then being forced backward with relation to the eccentrics 13, its winding cam surface automatically cams the clutch bolt 19 back to its normal position shown in Fig. 3 and releases the driven sprocket 20. When the fork is thus released from the driven sprocket, it will drop by gravity back into its lowered or operative position ready to pick up another shock of grain. The movements of the fork are, therefore, very quickly completed so that shocks of grain quite close together may be picked up. It is here further important to note that the engine used to operate the fork has no other function to perform in as much as the vehicle is moved forward by other power. Hence, a small and very light engine may be employed for operating the fork and the speed at which the fork will be operated may be very rapidly performed and is independent of the advance movement of the machine. The automatically tripped clutch positively prevents breakage of the parts and all the operator has to do is to trip the clutch into action when the shock is properly loaded on the fork.

What I claim is:

In a loader, the combination with a carrying vehicle and a loading fork hinged to the front end thereof, of a transverse shaft on the front portion of the vehicle body, toothed eccentrics on said shaft, fork lifting chains connected to said eccentrics working on the teeth thereof, an engine carried by said vehicle, a loose wheel on said shaft continuously driven from said engine, a clutch for connecting said shaft to said engine driven wheel, at will, and an automatic trip for tripping said clutch out of action when said fork has reached a predetermined elevation.

In testimony whereof I affix my signature in presence of two witnesses.

JOHN F. VALLENTYNE.

Witnesses:
 HARRY D. KILGORE,
 F. D. MERCHANT.